July 26, 1960

C. F. MAY 2,946,925

SYSTEM FOR EFFECTING AUTOMATIC CONTROL
OF A VEHICLE POWER TRANSMISSION SYSTEM

Filed Nov. 22, 1955

2 Sheets-Sheet 1

Inventor:
C. F. May

By: Glascock Downing & Seebold
Attys.

July 26, 1960

C. F. MAY 2,946,925

SYSTEM FOR EFFECTING AUTOMATIC CONTROL
OF A VEHICLE POWER TRANSMISSION SYSTEM

Filed Nov. 22, 1955

2 Sheets-Sheet 2

Inventor:
C. F. May
By: Hancock Downing & Seebohm
Attys.

United States Patent Office 2,946,925
Patented July 26, 1960

2,946,925

SYSTEM FOR EFFECTING AUTOMATIC CONTROL OF A VEHICLE POWER TRANSMISSION SYSTEM

Clifford Frank May, Moseley, Birmingham, England, assignor to Joseph Lucas (Industries) Limited, Birmingham, England Filed Nov. 22, 1955, Ser. No. 548,459

Claims priority, application Great Britain Nov. 27, 1954

5 Claims. (Cl. 317—5)

This invention has for its object to provide in a simple form a system responsive to engine or vehicle speed for effecting automatic control af a variable speed power transmission system on a road or rail vehicle.

A system in accordance with the invention comprises an electric current generator adapted to produce a voltage which varies with speed, a relay the winding of which is supplied with current by the generator, a variable resistance in series with the said winding and controlled by or in response to movement of the engine accelerator pedal, a normally open electromagnetically operable switch for short-circuiting at least a part of the resistance, a normally closed switch in the circuit of the said short-circuiting switch and operable by or in response to movement of the pedal, and a separately energised gear-changing electromagnet under the control of the relay.

Figure 1:
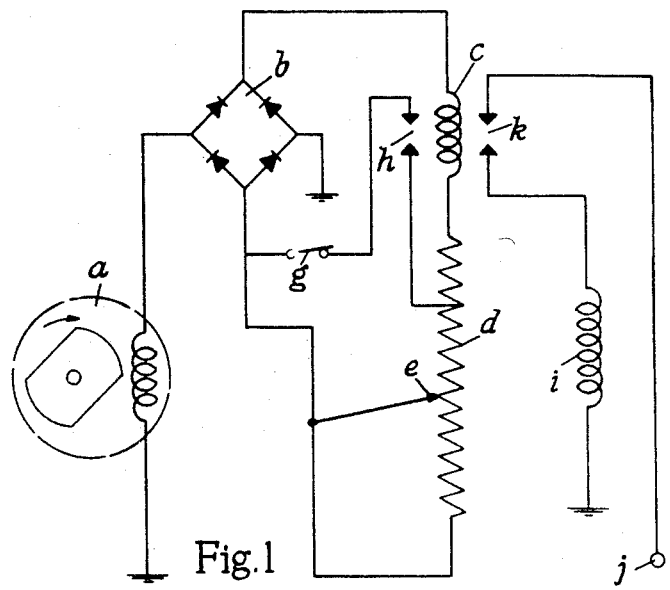
Figure 2:
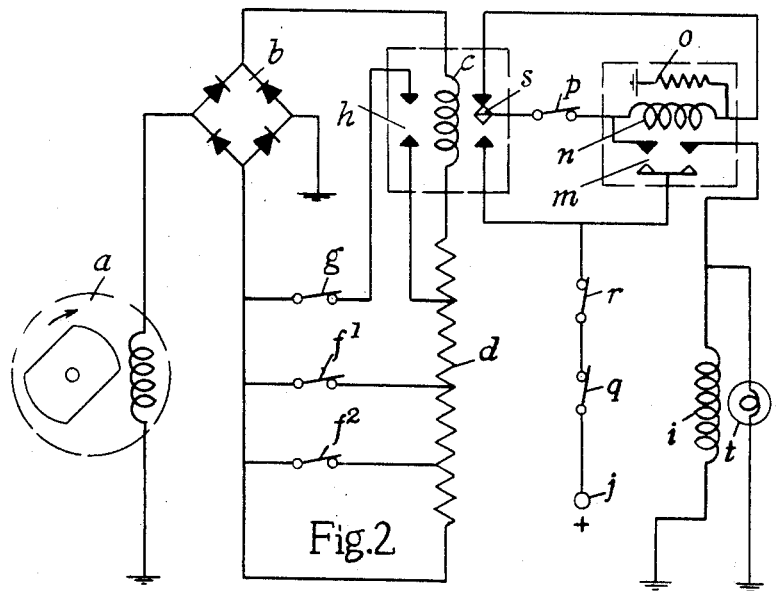
Figure 3:
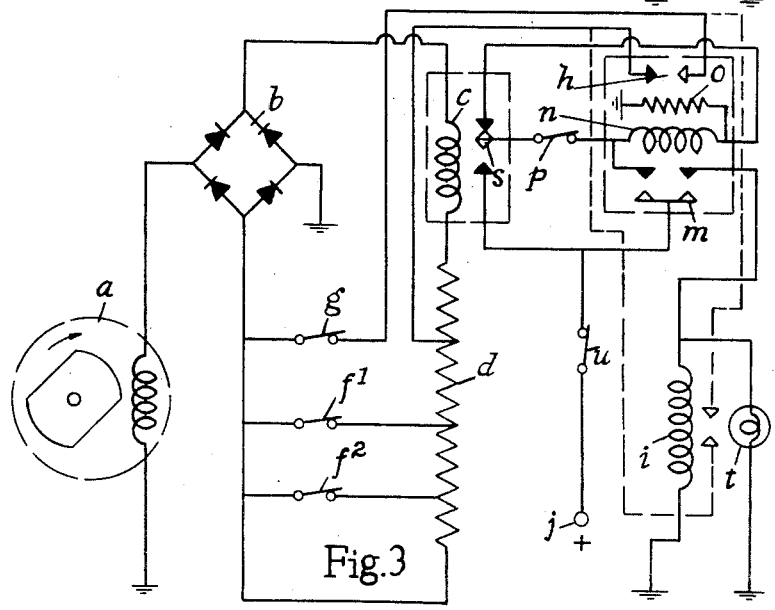

In the accompanying drawings, Figures 1, 2, 3 are diagrams illustrating typical embodiments of the invention. Referring to Figure 1, the arrangement there shown is designed to effect automatic control of an over-drive power transmission mechanism. The current generator to be driven by the engine or other associated source of motion, is indicated by $a$. This serves to provide a voltage which increases with increase of speed. When an alternating current generator is used, the current is supplied through a rectifier $b$ to a relay winding $c$. In series with this winding is connected a variable resistance $d$ which is variable by a slidable contact $e$, the latter being movable by the engine accelerator pedal, or any associated part which moves in consequence of movement of the pedal, the amount of resistance in action being increased with movement of the pedal in the direction for increasing the opening of the throttle. Alternatively the said contact $e$ may be moved by any suitable automatic means responsive to a condition which changes as a consequence of movement of the pedal. For example, it may be moved by a mechanism which is responsive to changes of pressure in the air-intake manifold of the engine which result from movement of a pedal-actuated throttle.

Instead of varying the resistance $d$ by a movable contact it may be varied by means of a normally-closed switch or switches in a tapping or tappings connected to the resistance as shown by $f1$, $f2$ in Figures 2 and 3 the said switch or switches being operable by or in response to movement of the pedal.

In addition there is connected to the resistance $d$ a circuit by which at least a part of the resistance can be short-circuited, and in this circuit is contained a normally-closed switch $g$ which is movable to the open position by or in response to movement of the pedal, and a normally open switch $h$ which can be closed by the relay.

The gear-changing electromagnet is indicated by $i$, this electromagnet being separately energised by current supplied by a battery or other source connected to the terminal $j$, and in series with this winding is arranged a normally-open switch $k$ which can be closed by the relay.

The arrangement is such that so long as the speed of the generator $a$ remains below a predetermined rate, the gear-changing electromagnet $i$ remains idle. The said speed is dependent on the position of the pedal-actuated engine controlling throttle, and hence on the amount of resistance in series with the relay. If while the throttle is in a given position the speed exceeds the predetermined rate, the current then supplied to the relay will cause the latter to close the switch $k$, so causing the over-drive mechanism to be brought into action, thereby causing the output shaft of the mechanism to be driven at a higher rate than its input shaft. At the same time the relay closes the switch $h$ and thereby causes the switch $k$ to be held closed until the speed of the generator falls sufficiently to render the relay ineffective. Both switches then re-open under the action of associated springs, and the over-drive mechanism reverts to the condition in which the output and input shafts are driven at the same rate.

If before the over-drive mechanism has been rendered operative, as above described, the throttle has been moved by the pedal to a more open position, the resistance by such movement having been increased, the relay will only become operable for bringing the over-drive into action when the engine attains a higher speed than that which previously sufficed to bring the over-drive mechanism into action.

If the driver desires to put the electromagnet $i$ out of action before the speed has fallen sufficiently to effect re-opening of the switch $h$, momentary actuation of the throttle by the pedal to its fully open position will cause the switch $g$ to open and so reduce the relay current sufficiently to cause the relay to release the switch $k$.

Whilst the arrangement above described is satisfactory, it is desirable to relieve the relay of the duty of holding the switch $k$ closed after the gear-changing electromagnet $i$ has been brought into action, and for this purpose it is preferred to employ the arrangement shown in either Figures 2 or 3.

Referring to Figure 2, the resistance $d$ in this arrangement may be varied by a slidable contact as shown in Figure 1, but it is more convenient to provide it with at least one tapping controlled by a normally-closed switch. In the example illustrated it is provided with two such tappings, a switch $f1$ being provided in one of them, and a switch $f2$ in the other. Each switch is operable by the pedal, or in response to movement of the pedal, the switch $f1$ being opened at about ⅓ full throttle, and the switch $f2$ being opened at about ⅔ full throttle. In other respects the part of the system associated with the generator and relay is similar to that shown in Figure 1.

As regards the part of the system associated with the gear-changing electromagnet $i$, this includes a normally open switch $m$ which is movable to its closed position by an electromagnet $n$ the latter having in series with it a current-limiting resistance $o$. In series with $n$ is provided an isolating switch $p$ arranged to be open when the throttle is in its fully closed position. Current is supplied at the terminal $j$ and is controlled by two normally closed switches $q$, $r$, the switch $q$ being an isolating switch for use when it is required to render the gear-changing electromagnet inoperable, and the switch $r$ being adapted to be opened when it is required to bring the reversing gear of the vehicle into action. The circuit through the winding of the electromagnet $n$ is also controlled by a two-way switch $s$ which is movable to the position in which it closes the circuit of the gear-changing electromagnet by the relay $c$. On moving the switch to this position current passes from $j$ to the electromagnet $n$ and so effects closing of the switch $m$ for enabling the current to pass also to the gear-changing electromagnet $i$.

When the switch $s$ is released by the relay it moves to the position shown where it closes a short-circuiting circuit, and so puts the electromagnet n out of action.

If desired there may be combined with the gear-changing electromagnet i, a parallel circuit containing a lamp t which serves as a signal to the driver that this electromagnet is in or out of action.

It is not essential to the invention that the switch h shall be operable by the relay when the system comprises the arrangement shown in Figure 2. It may be actuated by any other electromagnet in the system which is energized when the relay closes the switch s. Alternative positions of the switch h are shown in Figure 3. In one such position the switch h is adapted to be closed by the electromagnet n as shown in full lines. In another position the said switch is adapted to be closed by the gear-changing electromagnet i as shown by dotted lines.

Another modification shown in Figure 3 relates to the switch connected to the supply terminal j. Instead of two switches q, r as shown in Figure 2, a single switch u is provided, this serving to isolate the gear-changing electromagnet both when the reverse gear is brought into action, and also at other times when it is required to render the said electromagnet inoperative.

As already mentioned, the arrangements shown in the drawings are required to effect automatic control of an over-drive mechanism. They may also be used for controlling an under-drive mechanism, whereby the output shaft of the transmission mechanism is caused to be driven at the same speed as the input shaft at a given speed of the engine, the said mechanism being caused to revert automatically to the condition in which the output shaft is driven at a lower rate than the input shaft when the speed of the engine falls. Further, the said arrangements shown in the drawings may be used in conjunction with an ordinary 3 or 4-speed gear box in which it is required to effect automatic change between the top speed gear and the next lower speed gear. Also it may be used for controlling the actions of two separate and interconnected variable speed mechanisms.

The invention is not however restricted to the particular examples described as minor details may be varied to suit different requirements.

Having thus described my invention what I claim as new and desire to secure by Letters Patent is:

1. A system for effecting automatic control of a vehicle variable-speed power transmission mechanism, comprising in combination an electric current generator of the kind adapted to produce a voltage which varies with the speed of said generator, a first electric circuit containing said generator, electromagnetic means consisting in part of a relay having a winding in said electric circuit so that current from said generator can flow through said winding, a resistance connected in series with said winding, manually-responsive contact means electrically connected to said resistance for co-operating therewith to vary current flow through said winding from said generator, a normally-open first switch connected in parallel with said resistance and contact means and closable by a part of said electromagnetic means to short-circuit at least a part of said resistance in response to a predetermined current flow through the winding of said relay, a manually-responsive and normally-closed second switch connected in series with said normally-open switch so that the latter is rendered ineffective when said normally-closed second switch is opened, a gear-changing electromagnet formed by a part of said electromagnetic means, a second electric circuit containing said gear-changing electromagnet, said second electric circuit being separate from said first electric circuit and serving, when closed, to energise said gear-changing electromagnet, and a third switch for controlling said gear-changing electromagnet and operable by said relay in response to a predetermined current flow through the winding of said relay.

2. A system according to claim 1 and having a normally-open fourth switch in the second electric circuit, and an electromagnet forming a part of the electromagnetic means and having a winding connected in parallel with the fourth switch for closing the latter under the control of the third switch, said third switch having the form of a two-way switch which in one position initiates energisation of the winding of the last mentioned electromagnet, and in its other position causes that winding to be short-circuited.

3. A system according to claim 1, in which the first switch is closable by the relay.

4. A system according to claim 1, in which the first switch is closable by the gear-changing electromagnet.

5. A system according to claim 1, in which the first switch is closable by another electromagnet connected to the second electric circuit and forming a part of the electromagnetic means.

References Cited in the file of this patent

UNITED STATES PATENTS

| | | |
|---|---|---|
| 1,246,687 | Wells | Nov. 13, 1917 |
| 1,810,306 | Trofimov | June 16, 1931 |
| 2,307,576 | De Croce | Jan. 5, 1943 |
| 2,628,345 | Tod | Feb. 10, 1953 |
| 2,683,244 | Salaun et al. | July 6, 1954 |
| 2,840,775 | Steadman | June 24, 1958 |